United States Patent
Michelson

[15] 3,679,972
[45] July 25, 1972

[54] MICROMETER THICKNESS GAGE
[72] Inventor: Louis Michelson, Belmont, Mass.
[73] Assignee: Lion Precision Corporation, Newton, Mass.
[22] Filed: April 26, 1971
[21] Appl. No.: 137,324

[52] U.S. Cl. .................. 324/61 R, 317/246, 340/200
[51] Int. Cl. .................................. G01r 27/26, G01r 7/00
[58] Field of Search ............... 324/61 R, 61 P, 61 QS; 340/200; 317/246; 72/16

[56] References Cited

UNITED STATES PATENTS 1,924,087  8/1933  Allen ................................. 324/61 R Primary Examiner—Rudolph V. Rolinec
Assistant Examiner—Ernest F. Karlsen
Attorney—Kenway, Jenny & Hildreth

[57] ABSTRACT

A gage for measuring the deviation in thickness of sheet material by measuring the sum of the capacitances between a top electrode and the upper surface of the sheet and a lower electrode and the bottom surface of the sheet. The gage is calibrated with a precise calibration sheet of known thickness, by adjusting the vertical position of the upper electrode to produce a null output on a capacitance bridge. For measuring, the upper electrode, adjustably mounted on a precise micrometer screw, is then adjusted by a distance precisely equal to the difference between the calibration sheet thickness and the target thickness of the material to be measured.

5 Claims, 4 Drawing Figures

INVENTOR
LOUIS MICHELSON
BY
Kenway, Jenney & Hildreth
ATTORNEYS

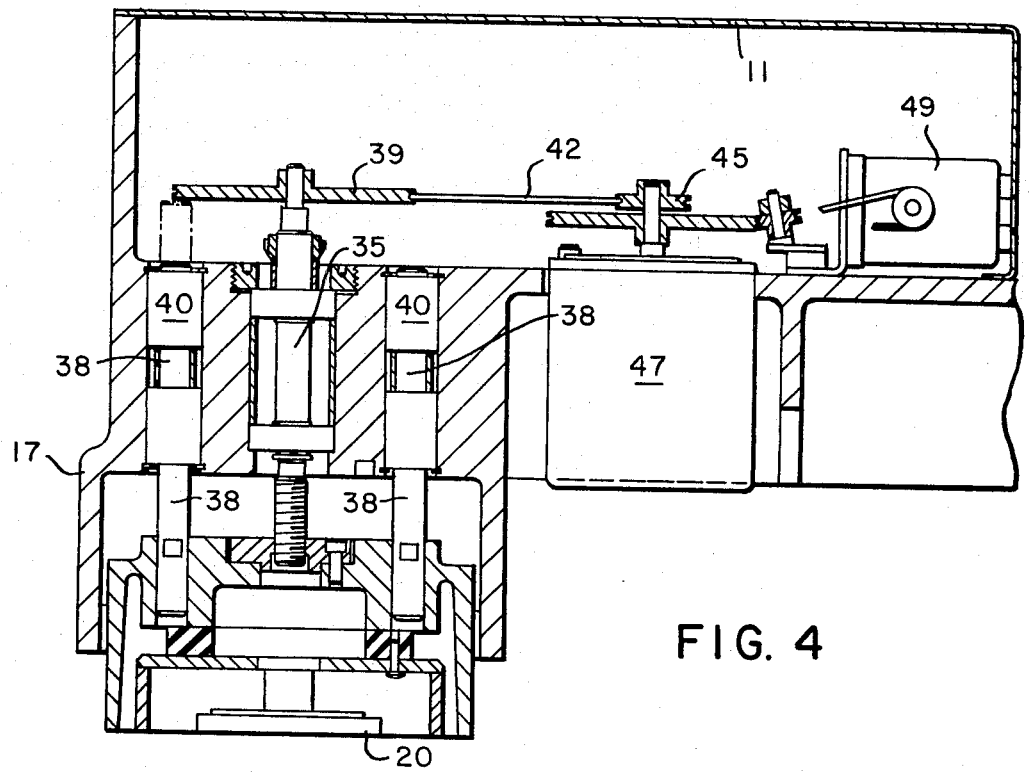
FIG. 4
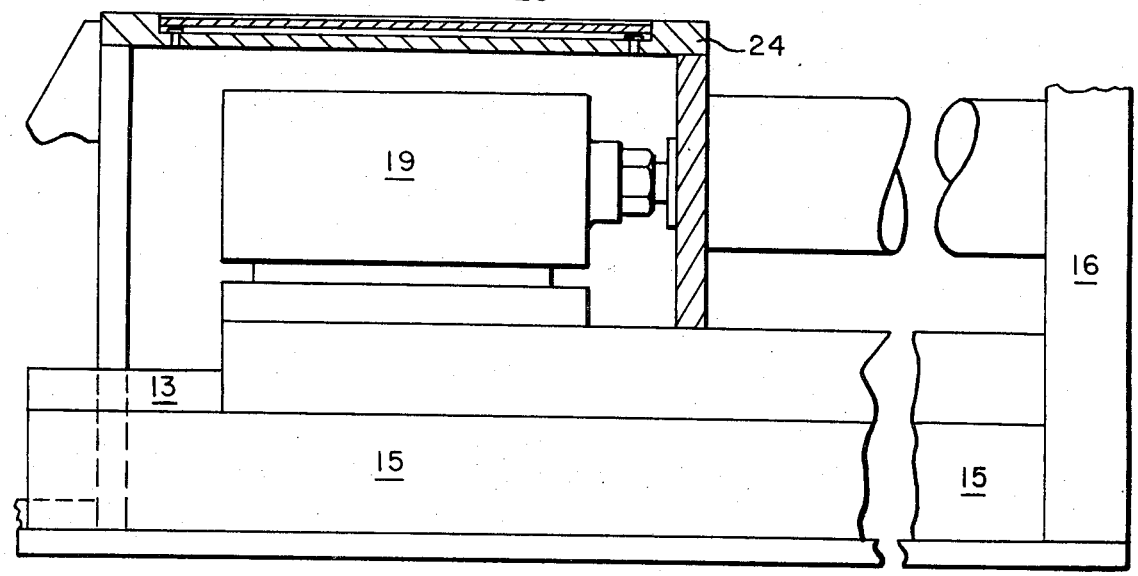
INVENTOR
LOUIS MICHELSON
BY
*Kenway, Jenney & Hildreth*
ATTORNEYS

MICROMETER THICKNESS GAGE

BACKGROUND OF THE INVENTION

This invention relates in general to industrial thickness gages and more particularly to a capacitance gage for measuring the thickness of sheets of electrically conductive material.

FIELD OF THE INVENTION

Industrial gages employing a number of different measurement principals have been used to measure the thickness of sheet materials in a number of different processes. Typically the gage senses the thickness of the sheet material as it passes beneath it and provides an output electrical signal proportional to the deviation of the measured thickness from the target thickness for the process. The electrical signal is than used in a control system for controlling the thickness of the material as it is processed. One type of gage which has been useful in measuring the thickness of sheet materials which are electrically conductive is a capacitive gage, which may include a pair of spaced electrodes positioned in confronting relationship on either side of the sheet material. Variations in the thickness of the sheet material are determined by measuring variations in the sum of the capacitances from one fixed electrode to the adjacent surface of the sheet material and from the opposite surface of the sheet material to the other fixed electrode. Thus, to a first approximation, the capacitance measured is dependent only upon the thickness of the sheet material and is independent of the variation in the vertical position, commonly denoted " flutter ", of the sheet material. The output of the gage is generally expressed in terms of deviation in thickness from the target thickness of the material and accordingly the capacitance neasuring circuitry is calibrated to provide a zero output signal when the measured capacitance corresponds to the target thickness of the material.

In order to calibrate gages of this type, a calibration sample of the target thickness is inserted between the electrodes and the capacitance measuring circuitry is nulled to produce a zero output signal. Where the same gage is used for a number of different thicknesses of material, gages of this type, employing this calibration procedure, exhibit some problems. One problem arises from the requirement that the calibration samples be of precisely measured thickness and that there not be introduced any errors as a result of variations in the precision of these samples of these calibration materials. The second problem arises from the fact that the same circuitry is being used to measure deviations in capacity where the total actual value of the capacity differs widely from a very thin to a very thick sample. Thus in order for the calibration to be preserved, the capacitance measuring circuitry must exhibit linear characteristics over a relatively wide range. Acceptable gaging errors are frequently in the order of 0.0005 inches, even for material thicknesses in the order of 0.200 inches, and hence the linearity of the circuitry and the precision of the calibration samples is very critical.

SUMMARY OF THE INVENTION

Broadly speaking, the thickness gage of this invention is of the capacitance measuring type and employs a pair of electrodes spaced in confronting relationship on a frame, with the electrically conductive sheet material passing through the air gap between the two electrodes. The measurement of thickness of the material is accomplished by measuring the sum of the capacitances between the upper electrode and the upper surface of the sheet and the lower surface of the sheet and the lower electrode. For this type of gage, the sheet must be electrically conductive. The lower electrode is fixed in position on the frame, but the upper electrode is mounted for precise adjustment along an axis toward and away from the other electrode. One suitable embodiment of the precise adjustment for the vertical position of the upper electrode is a precision micrometer screw. The gage also includes a calibration plate of very precisely determined thickness. A capacitance measuring circuit is connected to the electrodes and to the conductive sheet to provide an output indication of the value of the sum of the two capacitance. This circuit is generally of the null balancing type such that the output is actually an output signal indicating the deviation in capacitance from an established value of capacitance, for which value the circuit has been nulled.

In operation, the electrode spacing is adjusted to provide, with the calibration plate inserted in the gap between the two electrodes, a spacing between the upper electrode and the upper surface of the plate and the lower electrode and the lower surface of the plate such that the value of the sum of the two capacitances is well within the desired operating range of the capacitance measuring circuit and also such that expected variation in vertical position of the sheet material to be measured is less than the spacing between the electrodes.

In operation, the position of the upper electrode is adjusted with the calibration plate in place, until the spacing between the electrodes is the desired value and, at this spacing, the capacitance measuring circuit is adjusted to provide a zero output. For measuring a sheet of different target thickness, the upper electrode position is varied by a distance precisely equal to the difference between the known thickness of the calibration plate and the target thickness of the desired material. For example, if the calibration plate had a thickness of 0.200 inches and the target thickness of the sheet material to be measured were 0.010 inches, then the precision micrometer position would be changed to decrease the spacing between electrodes by precisely 0.190 inches. The measurement of the sheet material is then carried out, without the calibration plate in place.

It should be noted that under these conditions, a single calibration plate, the thickness of which may be very precisely determined, is needed, rather than a range of plates corresponding to each target thickness to be measured. With a precision micrometer the adjustment in vertical spacing may be carried out with a precision substantially less than 0.0005 inches and accordingly no significant error is introduced by this adjustment. Since the capacitance being measured varies directly with the distance between one electrode and the adjacent surface of the sheet material and the other electrode and the opposite surface of the sheet material, then by decreasing the spacing between the electrodes by precisely that amount which is the difference between the calibration plate thickness and the target thickness of the sheet material to be measured, the distance between each electrode and the adjacent surface of the sheet for measurement at target value, is precisely the same as was obtained with the calibration plate in place. Thus, for varying thicknesses of sheet material the capacitance at target value, will be precisely the same and the deviation, expressed in inches, from the target value corresponds to a deviation in capacitance, which is the same for all values of target thickness. Under these circumstances there is no dependence upon linearity of the circuit for maintaining the precision and accuracy at different thicknesses of the sheet material.

DESCRIPTION OF THE DRAWINGS

In the drawing:

FIG. 4 is an illustration of the upper electrode adjustment mechanism for one embodiment of the gage of FIG. 1.

DESCRIPTION OF PREFERRED EMBODIMENTS

Figure 1:
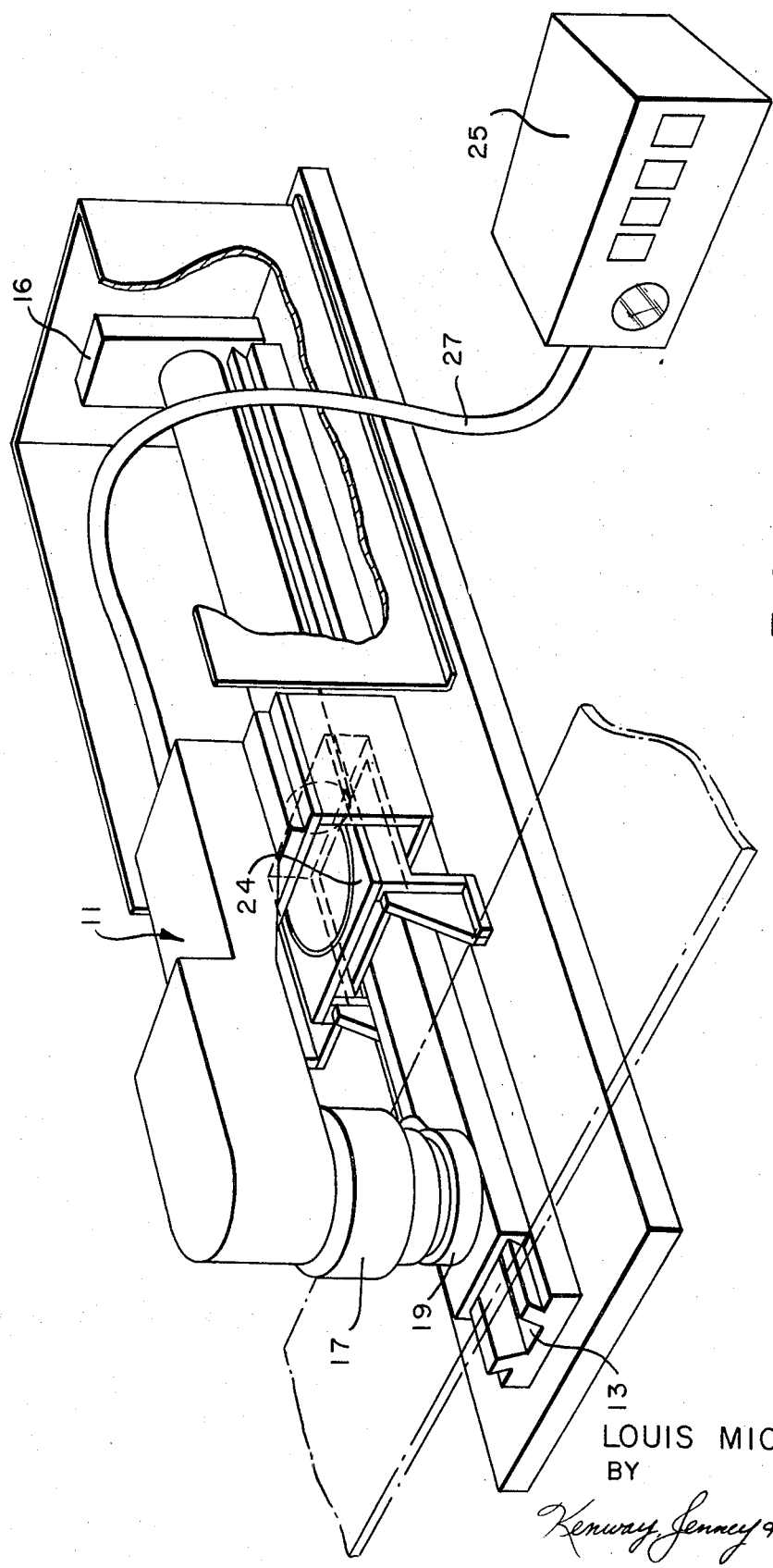
FIG. 1 is an illustration generally in perspective view of a thickness measuring gage, constructed in accordance with the principles of this invention.
Figure 3:
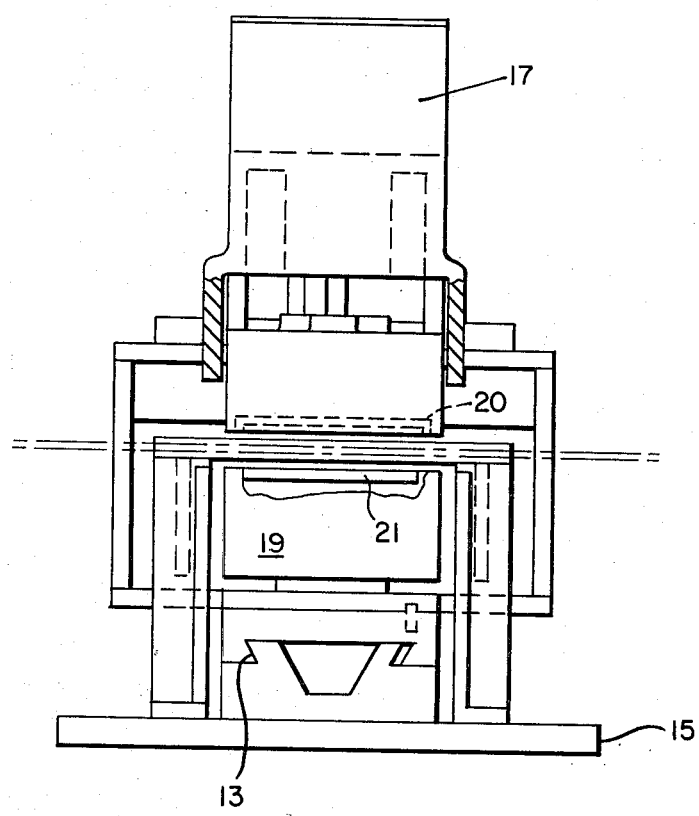
FIG. 3 is an end view, with a portion broken away of the gage of FIG. 1.

Referring to FIG. 1, the thickness gage of the invention is shown as including a generally elongated U-shaped frame 11 mounted in a keyway 13 on a base 15 for sliding motion along the length of the base. Attached to the rear of the frame 11 is an air cylinder 18 which is controlled by a control unit 16 to slide the frame 11 to an outer measuring position (as shown( or retract it to a calibration position. Mounted on the open ends of the frame 11 are an upper electrode assembly 17 and a lower electrode assembly 19, the upper electrode assembly as is more clearly shown in FIG. 3, including upper electrode 20, while the lower electrode assembly contains a lower electrode 21. The capacitance being measured is the total of the capacitances of what may be considered two capacitors, one being formed by the upper electrode and the upper surface of the sheet material being measured (shown in phantom in FIG. 3), with the second capacitor being formed by the lower surface of the sheet material being measured and the lower electrode 21. The sheet material is electrically grounded. As will be described in more detail below, the upper electrode 20 is arranged to be precisely adjusted in the vertical direction.

Electrical console unit 25 which provides for readout of the variations in thickness in the target value, by determining the variations in capacitance, is connected by electrical cables 27 to the upper and lower electrodes 20 and 21. Portions of the circuitry, for example, oscillator drives are preferably located near the electrodes on the frame. A calibration plate 24 is mounted at a fixed position to the base 15 and positioned so that in the measuring position it lies within an opening in the frame, away from the upper-lower electrodes at the electrode assemblies. In a retracted position this calibration plate 24 is positioned precisely between the upper and lower electrodes 20 and 21 and provides for calibration of the gage.

Figure 2:
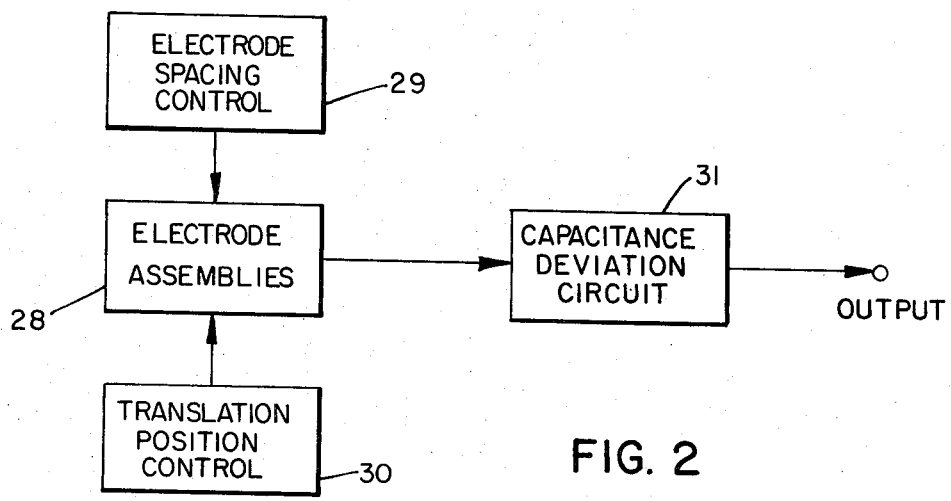
FIG. 2 is an illustration in block diagrammatic form of a measuring gage constructed in accordance with the principles of this invention.

In FIG. 2, the gage of the invention is illustrated in block diagrammatic form. It includes the electrode assemblies 28 with a translational position control 30 for controlling the translational position of the electrode assemblies and an electrode spacing control 29 for controlling the vertical space between the electrodes. The output from the electrode assemblies is applied to a capacitance deviation circuit 31, with the output from this circuit providing an output indication of the deviation in thickness of the sheet material from the target value. While the capacitance deviation circuit can take any of several conventional forms, one suitable circuit for performing this function is that sold by Lion Precision Corporation of Newton, Mass. under the designation Model TG3-15P. Similar circuits are described in U.S. Pat. No. 3,012,192, issued on Dec. 5, 1961.

The translation position control 30 may be any conventional control device coupled to the means for advancing and retracting the U-frame carrying the electrode assemblies according to a predetermined program. For example, the U-frame may be withdrawn from a pass line every 30 minutes in order to calibrate the gage. This function could also be performed manually and the calibration plate 24 may be inserted between the electrodes when the sheet to be measured is interrupted. The electrode spacing control 29 may be a manual element, such as a precision micrometer which can be turned to control the vertical position of the upper electrode with respect to the lower one. Alternatively a digital servo system may be employed together with a precision screw and a stepping motor to automatically drive the upper electrode to a spacing condition controlled by a preset thickness target value dialed into the device. Such an arrangement will be described below in conjunction with the illustration in FIG. 4.

Generally, in operation, the frame 11 is withdrawn for calibration with the calibration plate 24 positioned between the upper electrode assembly 17 and lower electrode assembly 19. The calibration plate 24 has a precise thickness, for example, 0.2000 inches and the capacitance deviation measuring circuitry is brought to a null output condition with this calibration plate in position. For a target thickness value which varies, for example, by 0.150 inches from the calibration plate thickness, the target thickness would be preset into the unit 25 and the upper electrode is then changed in position to a point exactly 0.150 inches displaced from the position it occupied during calibration. The gage is then translated to a position where the sheet material passes through the open jaws of the gage and, if the sheet material has a thickness precisely equal to the target thickness, the output from the capacitance measuring gage should again be zero. Any deviation from this target thickness will appear as a deviation on the output meter of the capacitance measuring device 25.

With reference now to FIG. 4 there is shown an electro mechanical arrangement for moving the upper electrode 20 to correspond to various target thicknesses. Within the upper electrode assembly there is included the upper electrode 20 which is mounted on a precision lead screw 35 for vertically adjustable movement within the frame 11. A pair of guide rods 38 are affixed to the upper electrode 20 and are journaled in bearings 40 set in the frame 11. The upper end of the precision lead screw 35 has fixed to it a no-slip pulley wheel 39 which is coupled by belt 42 to a second no-slip pulley 45 mounted on the shaft of a stepping motor 47. The pulley 45 is also coupled to a digital servo unit 49.

The digital servo unit may be any of several conventional servo units. Typically, the unit may be one in which dial wheels may be set to a desired nominal value for the calibration plate and a second set of dial wheels may be set to a value of target thickness for the measured sheet. The servo unit provides an output current to actuate a stepping motor in one direction or the other until the stepping motor has stepped a number of steps in the appropriate direction to have changed its position from the nominal position by the same amount that the setting of the target value dial wheels in the digital servo unit differ from the nominal setting position. Thus if the input dial wheels are set for a thickness of 0.150 and the nominal position of the servo unit is equal to 0.200 then the stepping motor must step in a negative direction 50 steps in order to bring the unit back to stability. The motion of these 50 steps in the stepping motor 47 are transferred through the no-slip pulleys to the precision screw 35 and hence effect a precise vertical displacement motion of the upper electrode 20. Other automatic techniques for setting this spacing may, of course, be employed.

What is claimed is:

1. A gage for measuring the deviation in thickness of electrically conductive sheet material from a target value of thickness comprising:

first and second spaced apart confronting electrodes;

a calibration sheet formed of electrically conductive material and having a precisely determined thickness;

positioning means for positioning said first and second electrodes in a first position wherein said calibration sheet is interposed between said electrodes and for positioning said electrodes in a second position wherein said electrically conductive sheet to be measured is placed between said first and second electrodes;

a null type capacitance measuring circuit connected to said first and second electrodes and to the sheet material positioned between said electrodes, said capacitance measuring circuit providing an output signal indicating the deviation from a nominal value of the variations in the sum of the capacitances formed between said first electrode and the surface adjacent to it of the sheet material positioned between the electrodes, and the capacitance formed between said second electrode and the surface adjacent to it of the sheet positioned between the electrodes;

adjusting means for precisely adjusting the spacing between said electrodes;

said adjusting means having a predetermined calibration spacing with said calibration sheet interposed, said adjusting means including means for changing said spacing for measurement of the sheet material by a distance precisely equal to the difference between the thickness of said calibration sheet and the target value of thickness of said material; and means for setting the nominal value of said capacitance measuring circuit to correspond to the sum of the capacitances with said electrodes at said predetermined calibration setting and said calibration sheet interposed therebetween, whereby in said second position the output signal from said capacitance measuring circuit represents deviations in thickness of said sheet material from said target value.

2. A gage in accordance with claim 1 and further including a frame member, said first electrode being mounted in fixed position on said frame member and said second electrode being mounted on said frame member by said adjusting means, said adjusting mean comprising a precision micrometer screw.

3. A gage in accordance with claim 2 wherein said frame is mounted for sliding movement with respect to said sheet material and said calibration sheet, and wherein said positioning means includes means for sliding said frame fron said first position to said second position.

4. A gage in accordance with claim 2, said adjusting means further including a stepping motor and a servo positioning unit, having means for entering said target thickness therein, said stepping motor being mechanically coupled to said precision micrometer screw to rotate said screw in precise increments as said stepping motor is stepped, said servo position unit being coupled to said stepping motor to actuate said stepping motor according to the value of target thickness entered into said servo unit.

5. The method of measuring the deviation in thickness of an electrically conductive sheet material from a target value of thickness utilizing a capacitance thickness gage having a pair of spaced confronting electrodes comprising the steps of:

spacing said electrodes with a predetermined distance between them;

inserting a calibration sheet formed of electrically conductive material and having a precisely determined thickness between said electrodes;

connecting a null type capacitance measuring means to said first and second electrodes such that the output signal from said capacitance measuring means varies with variation in the sum of the capacitances formed between said first electrode and the adjacent surface of the calibration sheet and the capacitance formed between said second electrode and the adjacent surface to it of the calibration sheet and nulling the capacitance measuring circuit to provide a zero output signal under these conditions;

removing the calibration sheet; and adjusting the spacing between said electrodes by an amount precisely equal to the difference between the thickness of said calibration sheet and the target value of thickness and inserting the sheet material between said electrodes.

* * * * *